United States Patent [19]
Iwasaki et al.

[11] Patent Number: 5,345,544
[45] Date of Patent: Sep. 6, 1994

[54] DATA BASE SYSTEM

[75] Inventors: Keisuke Iwasaki, Yamato-Koriyama; Masaki Takakura, Higashi-Osaka; Yasusuke Asayama, Nara, all of Japan

[73] Assignee: Sharp Kabushiki Kaisha, Osaka, Japan

[21] Appl. No.: 693,223

[22] Filed: Apr. 29, 1991

[30] Foreign Application Priority Data

Apr. 28, 1990 [JP] Japan ................... 2-113910

[51] Int. Cl.$^5$ .............................. G06F 15/62
[52] U.S. Cl. .................................. 395/140
[58] Field of Search ............... 395/140, 155, 156, 161, 395/153, 154; 340/706, 747; 345/113, 114, 115, 116

[56] References Cited

U.S. PATENT DOCUMENTS 5,165,012 11/1992 Crandall et al. ............... 395/100
5,182,796 1/1993 Shibayama et al. ............ 395/156

OTHER PUBLICATIONS

Richard A. Bolt (MIT) "Man–Machine Interface Evolution Theory" by Personal Media Corporation (Apr. 10, 1986), pp. 15–51.

Fusako Hirabayashi, Hiroshi Matoba, Yutaka Kasahara, "An internal representation and user interface method for information retrieval using emotional and feeling information as a clue", Proceedings of Information Processing Society 36 (1988), pp. 381–382.

"User Interface in Multi-Media Age", Nikkei Computer (Extra number), (Jul. 28, 1989), p. 63, pp. 65–66, pp. 130–136.

*Primary Examiner*—Phu K. Nguyen
*Attorney, Agent, or Firm*—Nixon & Vanderhye

[57] ABSTRACT

A data base system has a chart generation unit for generating a chart pattern in accordance with chart data applied thereto, an indicator management unit for managing a plurality of indicators which symbolize particular functions, and attribute information associated with the indicators, and an indicator pattern generation unit for generating indicator patterns representative of the indicators in accordance with the attribute information associated with the respective indicators, which attribute information are managed by the indicator management unit. The system further has a display unit having a screen, for displaying the chart pattern generated by the chart generation unit and the indicator patterns generated by the indicator pattern generation unit, on the screen as a retrieval chart, a designation unit for designating a desired area on the retrieval chart displayed on the screen, a extraction unit for extracting a plurality of indicators included in the area designated by the designation unit, by retrieving the attribute information managed by the indicator management unit, and a processing unit for processing together the indicators extracted by the extraction unit.

17 Claims, 18 Drawing Sheets

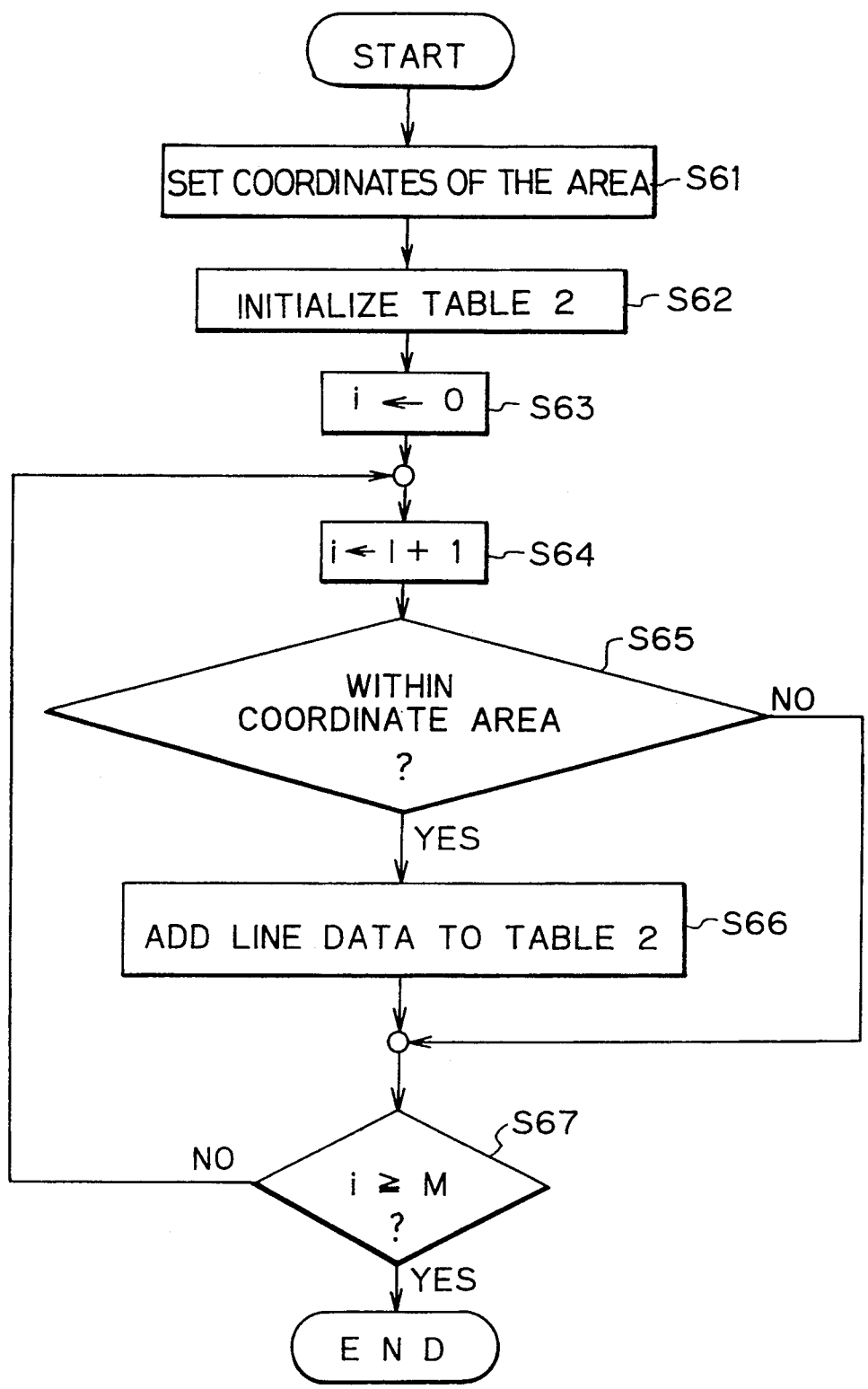

151

211

221

DATA BASE SYSTEM

BACKGROUND OF THE INVENTION

1. Field of the Invention

The present invention relates to a data base system for recording and managing various data.

2. Description of the Related Art

If information is managed by means of a data base system for searching a record in a file, not only a particular record can be directly retrieved by using an ID number and other identification indicators but also an operator can determine various conditions for character-strings or numerical values serving as keys for retrieval so as to freely and conveniently obtain a record matched with the conditions.

One type of such a data base system can treat desired data by superimposing indicators (called icons) which are composed of figures or the like and symbolize particular functions on any positions on a chart on the screen, and by designating a desired function from the icons. Examples of the functions symbolized by such indicators are displays of still images, the playback of motion pictures, voice and music, and displays of character-strings and texts.

In such a data base system, when indicators are moved to other positions on the chart or when they are copied to a new chart, the operator has to move or copy the indicators such as icons with a coordinate designation device such as a mouse one after the other. Thus, if the relationship of positions of indicators disposed on a chart is functionally important in the system where each of indicators has to be independently processed, the operator should perform very complicated operations.

For example, in the state where indicators are displayed as shown in FIGS. 1a and 1b, if it is necessary to obtain an indicator group shown in FIG. 1c by copying indicators on the second line of FIG. 1a to the position between the first line and the second line of FIG. 1b, the operator has to downwardly move the eight indicators on the lower two lines one after the other and then to copy the three indicators on the second line shown in FIG. 1a one after the other. In particular, in the case where the relationship of positions of indicators is precisely required like those disposed on a map, such operations become very complicated.

On the other hand, when processes have to be successively executed in accordance with a plurality of indicators, the operator should select each of the indicators one after the other. For example, in the case each indicator accords with a process of "displaying respective pictures", the operator should repeatedly select each of the indicators one after the other in order to display corresponding images one after the other. Thus, such operations become extremely complicated.

SUMMARY OF THE INVENTION

It is therefore an object of the present invention to provide a data base system for treating various indicators in a single operation so as to simplify a moving operation and copy operation of indicators by the operator, and to simplify various processes symbolized by the indicators to be executed, while the relationship of positions of the indicators and the relationship between charts and the indicators are maintained.

According to the present invention, the above objects are accomplished by a data base system having a chart generation unit for generating a chart pattern in accordance with chart data applied thereto, an indicator management unit for managing a plurality of indicators which symbolize particular functions, and attribute information associated with the indicators, and an indicator pattern generation unit for generating indicator patterns representative of the indicators in accordance with the attribute information associated with the respective indicators, which attribute information are managed by the indicator management unit. The system further has a display unit having a screen, for displaying the chart pattern generated by the chart generation unit and the indicator patterns generated by the indicator pattern generation unit, on the screen as a retrieval chart, a designation unit for designating a desired area on the retrieval chart displayed on the screen, a extraction unit for extracting a plurality of indicators included in the area designated by the designation unit, by retrieving the attribute information managed by the indicator management unit, and a processing unit for processing together the indicators extracted by the extraction unit.

The indicators managed by the indicator management unit are patterned by the indicator pattern generation unit in accordance with the attribute information associated therewith, and then displayed on the screen of the display unit along with the chart pattern generated by the chart generation unit. The area including the indicators on the retrieval chart being displayed is designated by the area designation unit. The indicators included in the designated area are retrieved in accordance with their attribute information by the extraction unit. The indicators extracted are processed by the processing unit.

Thus, the moving operation and copy operation of a plurality of indicators by the operator and the execution of the process for symbolizing the indicators can be readily performed.

While the processing unit is storing the relationship of attribute information of the indicators retrieved, it executes the moving operation or copy operation for the indicators.

Further objects and advantages of the present invention will be apparent from the following description of the preferred embodiments of the invention as illustrated in the accompanying drawings.

BRIEF DESCRIPTION OF DRAWINGS

FIG. 7 shows a part of the program shown in FIG. 5;

DESCRIPTION OF THE PREFERRED EMBODIMENTS

Figure 2:
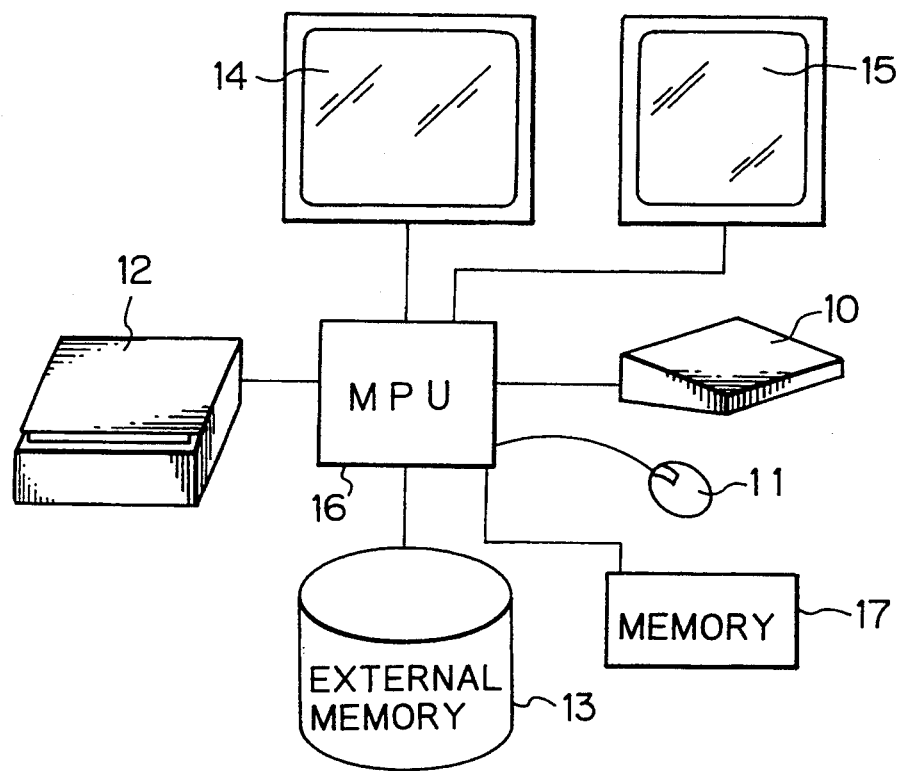
FIG. 2 schematically shows an overall construction of a data base system of a preferred embodiment according to the present invention.

FIG. 2 schematically shows a construction of hardware of a preferred embodiment of a data base system according to the present invention.

As shown in FIG. 2, the data base system comprises a keyboard 10, a mouse 11, an image input unit 12, an external memory unit 13, a first image display unit 14, a second image display unit 15, a microprocessor unit (MPU) 16, and a memory unit 17.

The keyboard 10 is an input unit with which the operator sends commands and information to the processor unit 16. Although the mouse 11 is also an input unit with which the operator sends commands and information to the processor unit 16, the operations of the mouse 11 are displayed on the screen of the second image display unit 15. This image display unit 15 is used, for example, for displaying the movement of a pointing mark such as a mouse cursor. The image input unit 12 is an input unit for reading an image on a paper or the like and for generating image data.

The external memory unit 13 is a hard disk or another memory unit for storing a data base process program, files processed by the program, chart patterns, and so forth.

Figure 1A:
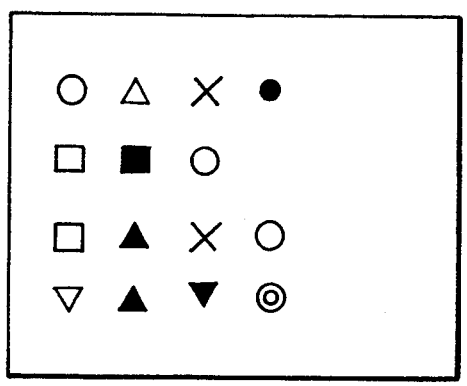
FIGS. 1a, 1b, and 1c which are charts describing a copy operation of a related art show arrays of indicators.
Figure 1B:
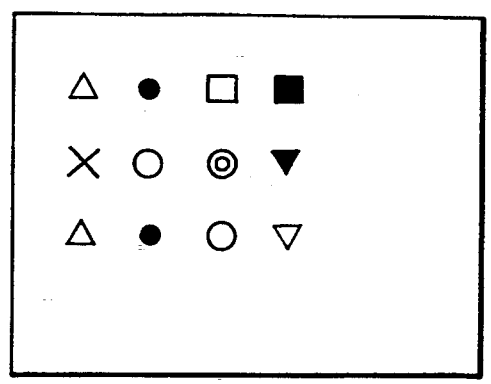
Figure 1C:
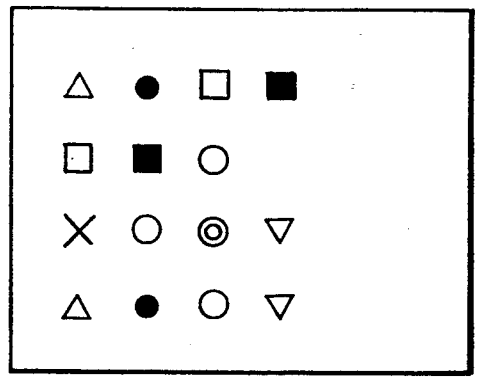

The first image display unit 14 is a bit map display for displaying picture images on a screen e.g. a CRT screen. The second image display unit 15 is also a bit map display for displaying charts and indicators on screen e.g. a CRT screen. The image display unit 15 may display one set of chart and indicator group or may display a plurality sets of charts and indicator groups in multiple windows. These first and second image display units 14 and 15 may be accomplished with two separate display units as shown in FIG. 1, or one display unit having the multiple window display function.

The memory unit 17 temporarily stores image and chart data to be displayed on the first and second image display units 14 and 15, and other data such as a management table (which will be described later), and operates as a work memory of the processor unit.

Figure 3:
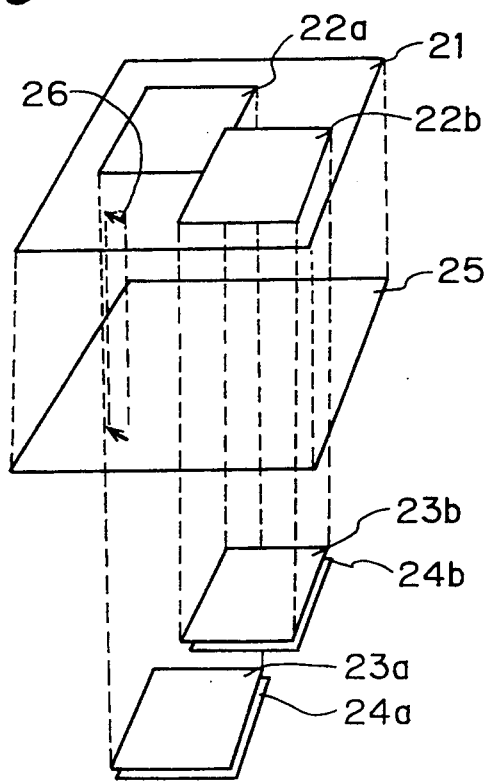
FIG. 3 shows a construction of a display unit of the embodiment shown in FIG. 1.

FIG. 3 is a chart describing a structure of the second image display unit 15 of the embodiment. A display plane 21 is an image memory for storing image data written in the format of the display unit 15. Pixel data stored in this memory is successively read and displayed on the display unit 15 of CRT. Image data are sent to the display plane 21 from indicator planes 23a, 23b, ... , chart planes 24a, 24b, ... and a cursor plane 25, and thus windows 22a, 22b, ... are formed. The cursor plane 25 is an image memory for writing a mouse cursor 26 and a chart, for example a rectangular chart, moving with the mouse 11. Since the display priority Of the cursor plane 25 is the highest, a chart written on this plane is always sent to the display plane 21. Pixel data on coordinates which are not written on the cursor plane 25 are sent from the indicator planes 23a, 23b, ... or from the chart planes 24a, 24b, ... Indicator planes 23a, 23b, ... and chart planes 24a, 24b, ... are arranged corresponding to windows 22a, 22b, ..., respectively. Each of the windows 22a, 22b, ... has individually display priority. Therefore, in an area of a plurality of the windows are overlapped, pixel data is sent only from an indicator plane and a chart plane corresponding to a window with the highest display priority. The indicator planes 23a, 23b, ... are memories for storing indicator data to be superimposed with a chart, in the form of the display format. The chart planes 24a, 24b, ... are memories for storing charts in the form of the display format. The display priority of the indicator planes 23a, 23b, ... is higher than that of the chart display planes 24a, 24b, .... In other words, only pixel data of image data which is written into the chart planes 24a, 24b, ... and which is not present on the indicator planes 23a, 23b, ... is sent to the display plane 21. With respect to the image data of the indicator planes 23a, 23b, ... , only pixel data with indicators is sent to the display plane. Each window has independent coordinates for charts and indicators. The upper left position of each window is referred to as origin (0, 0).

Figure 4A:
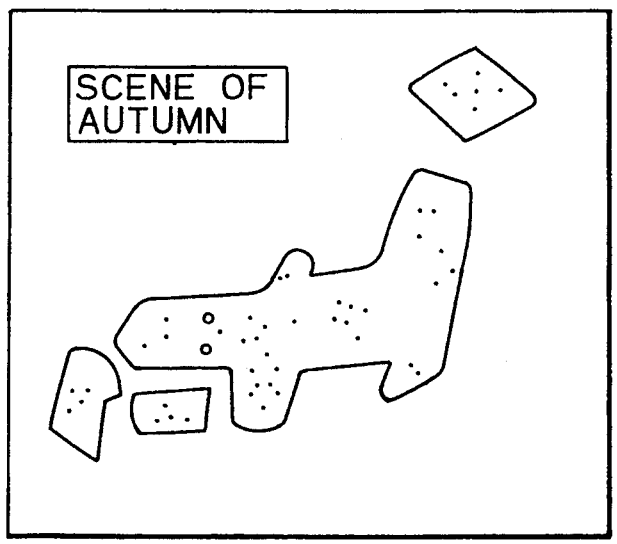
FIGS. 4a and 4b show examples of retrieval charts of the embodiment shown in FIG. 1.
Figure 4B:
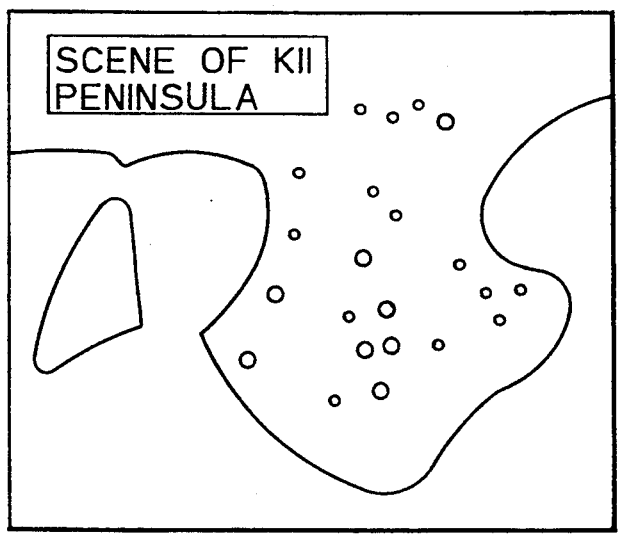

FIGS. 4a and 4b show charts and indicators displayed on one window of the second image display unit 15 of the above mentioned data base system. A set of charts and indicators is hereinafter referred to as a retrieval chart.

In FIGS. 4a and 4b, small circular marks "o" and large circular marks "◯" represent indicators, and lines and characters other than the indicators represent a chart. FIG. 4a is a source retrieval chart from which indicators are moved. FIG. 4b is a destination retrieval chart to which the indicators are moved. In the embodiment, a part of indicators shown in FIG. 4a are moved to the destination retrieval chart shown in FIG. 4b. Table 1a is a management table for storing the coordinates of indicators shown in FIG. 4a and ID numbers of image data that the indicators represent. Table 1b is a management table similar to that of the destination retrieval chart shown in FIG. 4b.

TABLE 1a

| ID number | X coordinate | Y coordinate |
| --- | --- | --- |
| 1 | 127 | 73 |

TABLE 1a-continued

| ID number | X coordinate | Y coordinate |
| --- | --- | --- |
| 2 | 368 | 211 |
| 3 | 249 | 307 |
| 4 | 315 | 96 |
| 8 | 203 | 367 |
| 13 | 350 | 270 |
| 11 | 291 | 333 |
| 6 | 247 | 172 |
| 9 | 223 | 394 |
| 17 | 165 | 116 |

TABLE 1b

| ID number | X coordinate | Y coordinate |
| --- | --- | --- |
| 21 | 129 | 417 |
| 23 | 875 | 83 |
| 25 | 424 | 382 |
| 26 | 709 | 117 |
| 30 | 383 | 960 |
| 27 | 259 | 510 |
| 29 | 780 | 482 |
| 51 | 733 | 231 |
| 48 | 214 | 456 |
| 34 | 635 | 210 |

These management table data and chart data are prepared for each retrieval chart and they are stored as independent files in the external memory unit 13. The chart data is read from the external memory unit 13 and then written on the chart planes 24a, 24b, ... by a chart generation program in order to display a corresponding retrieval chart on the second image display unit 15. If required, the management table data are sent to the memory unit 17 so as to be referenced and changed by the processor unit 16. In order to display indicators, corresponding management file data are sent from the external memory unit 13 to the memory unit 17 by an indicator pattern generation program. Then, figure component data representing the indicators are written at locations on the respective indicator planes 24a, 24b. ..., which locations correspond to the coordinate data in the management table.

ID numbers are assigned to the retrieval charts, respectively. The management table data files and the chart data files are managed by the ID numbers of the corresponding retrieval charts. The retrieval charts may be charts formed by using a graphic drawing program or may be images being inputted through the image input unit 12.

Hereinafter, operation of the data base system will be described with reference to a flow chart shown in FIG. 5.

At step S31, the source retrieval chart for moving indicator data shown in FIG. 4a is displayed on the second image display unit 15. In other words, the corresponding management table data are sent from the external memory unit 13 to the memory unit 17 so that the indicator data are written to each coordinate position of the indicator plane 23a or 23b and the chart data is written into the chart plane 24a or 24b.

Figure 6A:
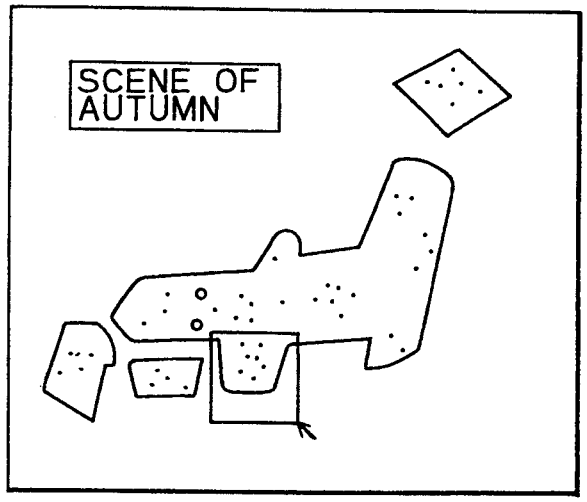
FIGS. 6a, 6b, and 6c show examples of retrieval charts of the embodiment shown in FIG. 1.
Figure 6B:
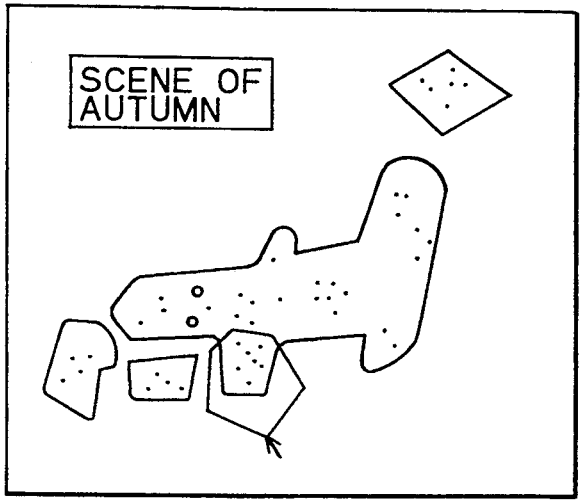
Figure 6C:
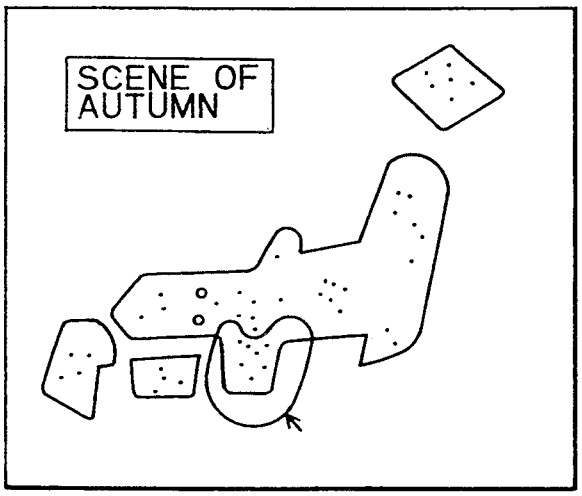

At step 32, the operator designates indicators in the source retrieval chart shown in FIG. 4a, to be moved to the destination retrieval chart shown in FIG. 4b. In fact, as shown in FIGS. 6a, 6b, and 6c, the operator designates indicators to be selected with the mouse 11 by forming an optional closed area in a rectangular shape or the like in the cursor plane 25. The arrow marks in FIGS. 6a, 6b, and 6c are the mouse cursors.

An indicator extraction program retrieves, at step S33, line data (a set of ID number and X and Y coordinates) whose X and Y coordinates are within the closed area selected at the step S32, from the management table shown in Table 1a stored in the memory unit 17. Thus, an indicator table constituted by only the retrieved line data is formed. Table 2 shows an example of this indicator table. In the embodiment, as shown in FIG. 6a, since indicators are selected with the rectangular area whose diagonal coordinates are (100, 300) and (300, 400), the line data which are present in the rectangular area in Table 1a are stored in Table 2.

TABLE 2

| ID number | X coordinate | Y coordinate |
| --- | --- | --- |
| 3 | 249 | 307 |
| 8 | 203 | 387 |
| 11 | 291 | 333 |
| 9 | 223 | 384 |

Now, with reference to a flow chart shown in FIG. 7, the process at the step S33 will be described in detail. In the flow chart, variable "i" denotes the content of a counter for counting the line number of data in Table 1a. This counter starts counting from 1. M is the total number of line data in Table 1a.

At step S61, variables in the memory unit 17 are set to the values indicating the coordinates of the closed area defined at the step S32. In this embodiment, since the indicators are selected by the rectangular area whose diagonal coordinates are (100, 300) and (300, 400), the following values are set to the variables.

$RX0=100, RY0=300$ $RX1=300, RY1=400$

At next step S62, a new Table 2 to be created is initialized. Namely, an empty management table which does not contain line data is created.

At step S63, i is set to "0" so as to initialize the line number counter.

At next step S64, the line number counter is incremented by "1". Namely, i is increased to i+1.

Then, at step S65, it is discriminated whether or not the closed area set at the step S61 contains the X and Y coordinate values of data at i-th line of Table 1a. In other words, where the X and Y coordinate values at the i-th line are (Xi, Yi), whether the following condition is logical or not is discriminated.

$(RX0 \leq Xi \leq RX1)$ AND $(RY0 \leq Yi \leq RY1)$

If the result is true, the process of step S66 is repeatedly executed. If the result is false, the processes starting from the step S67 are executed.

At the step S66, the line data at the i-th line of Table 1a is added to Table 2. Then, at next step S67, it is discriminated whether or not the discrimination process at the step S65 has been executed for all the line data of Table 1a. In other words, the content i of the line number counter is compared with the maximum line number M. If i $\geq$ M, the process is terminated. If i<M, the processes starting from the step S64 are repeatedly executed.

Figure 5:
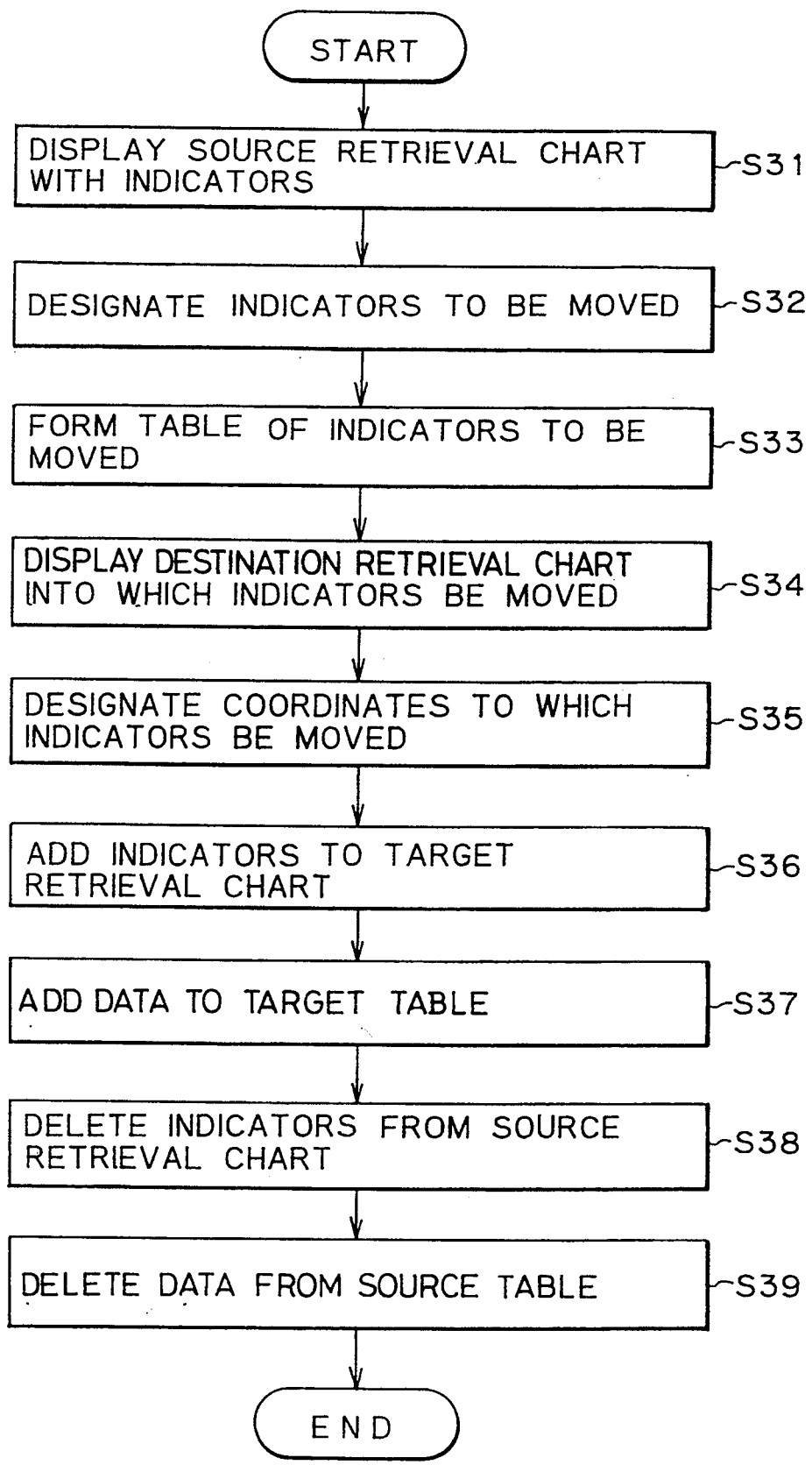
FIG. 5 shows a process flow of a program of the embodiment shown in FIG. 1.

When the process of routine shown in FIG. 7 is terminated, the program is returned to the main routine shown in FIG. 5.

Figure 8:
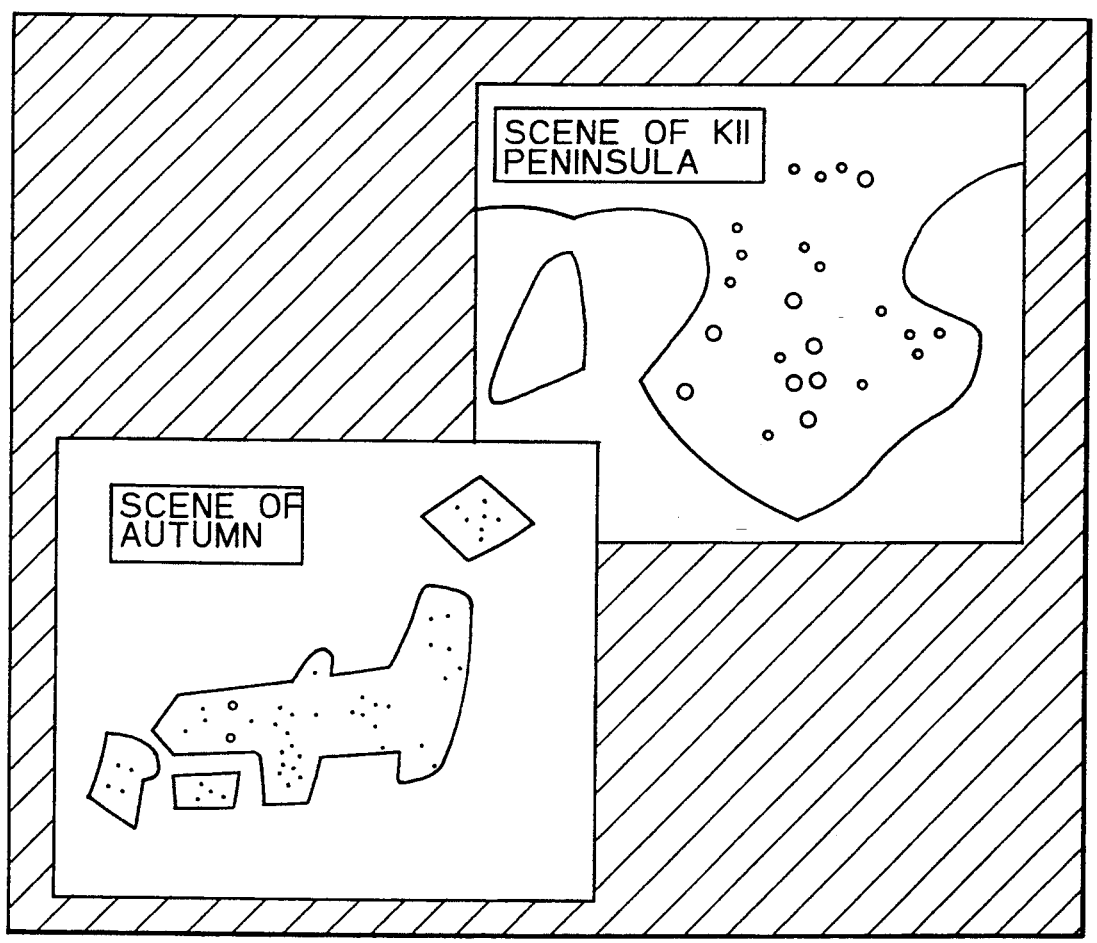
FIG. 8 shows another example of display of retrieval charts of the embodiment shown in FIG. 1.

At step S34 in the main routine, the destination retrieval chart shown in FIG. 4b is displayed on the second image display unit 15. The retrieval chart may be displayed on the entire display area of the display unit 15. As an alternative method, the retrieval charts shown in FIGS. 4a and 4b may be displayed in different windows of the same display unit 15 at the same time as shown in FIG. 8.

At next step S35, the operator designates a destination position in the retrieval chart shown in FIG. 4b, to which position the indicators represented by the line data in the selection table formed at the step S33 should be moved. In other words, the following processes [A] to [C] are executed.

[A] The minimum values (X0, Y0) and the maximum values (X1, Y1) of the X and Y coordinates in Table 2 are searched, and then the differences DX and DY thereof are calculated. In Table 2, if X0=203, Y0=307, X1=291, and Y1=394, DX and DY are expressed as follows.

$$DX = X1 - X0 = 291 - 203 = 88$$

$$DY = Y1 - Y0 = 391 - 307 = 87$$

Figure 9A:
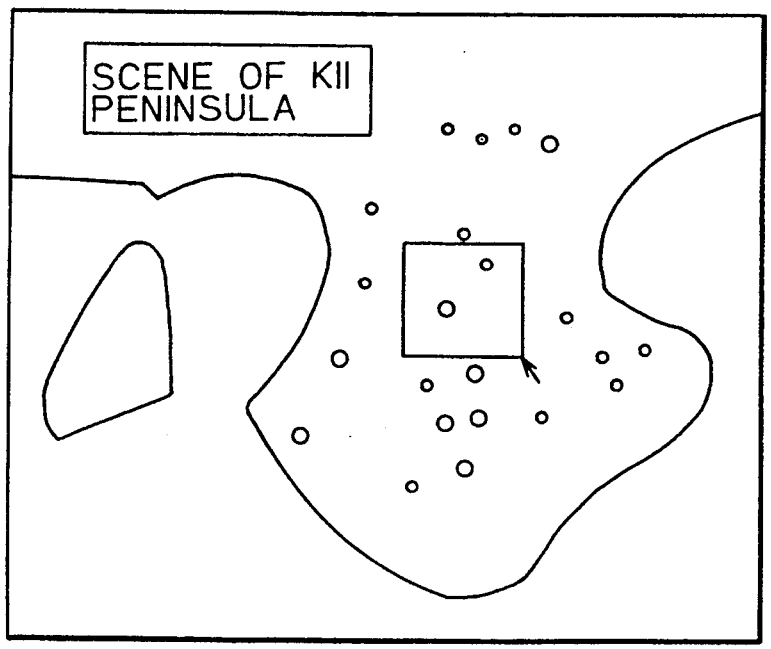
FIGS. 9a and 9b describe a method of designating a destination for moving the indicators shown in FIG. 1.
Figure 9B:
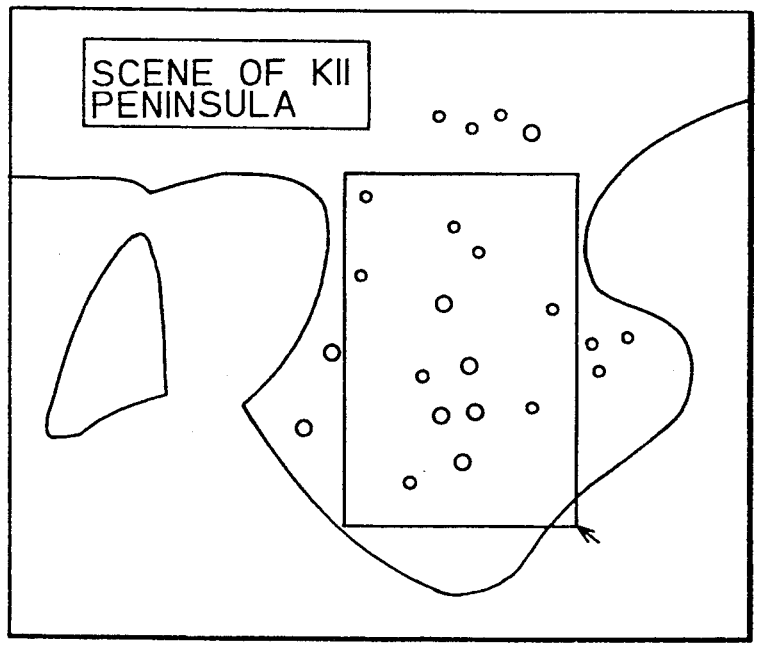

[B] A rectangle whose horizontal size is DX and vertical size is DY and which moves with the mouse 11 is written in the cursor plane 25 so as to superimpose the rectangle with the retrieval chart shown in FIG. 4b (see FIGS. 9a and 9b).

[C] By changing the display position of the rectangle written at the process of [B] by means of the mouse 11, the operator instructs the destination position in the retrieval chart shown in FIG. 4b to which position the indicators shown in Table 2 should be moved.

At that time, by designating movement magnifications BX and BY from the keyboard 10, the size of the rectangle to be displayed can be changed. FIG. 9a shows the case where the movement magnifications are not changed (BX=BY=1). FIG. 9b shows the case where BX=2 and BY=3. The arrow marks shown in FIGS. 9a and 9b are the mouse cursors.

In the illustrated embodiments, the lower right corner of the rectangle is an indication point of the mouse 11, and it is assumed that the coordinates at the indication point of the mouse 11 are set to (X2, Y2)=(400, 450).

At step S36, in accordance with the position and the magnifications designated in [C] at the step S35, the indicators in Table 2 are copied to the retrieval chart shown in FIG. 4b. In other words, with respect to the coordinate values in Table 2, the following calculations are executed.

$$X \text{ coordinate} = (X \text{ coordinate} - X1) \times BX + X2$$

$$Y \text{ coordinate} = (Y \text{ coordinate} - Y1) \times BY + Y2$$

As the result of the calculations, assuming that BX=2 and BY=3, the contents of Table 2 are changed to those shown in Table 3.

TABLE 3

| ID number | X coordinate | Y coordinate |
|---|---|---|
| 3 | 316 | 189 |
| 8 | 224 | 369 |
| 11 | 400 | 267 |
| 9 | 264 | 450 |

TABLE 4a

| ID number | X coordinate | Y coordinate |
|---|---|---|
| 1 | 127 | 73 |
| 2 | 368 | 211 |
| 4 | 315 | 96 |
| 13 | 350 | 270 |
| 6 | 247 | 172 |
| 17 | 165 | 116 |

TABLE 4b

| ID number | X coordinate | Y coordinate |
|---|---|---|
| 21 | 129 | 417 |
| 23 | 875 | 83 |
| 25 | 424 | 382 |
| 26 | 709 | 117 |
| 30 | 383 | 960 |
| 27 | 259 | 510 |
| 29 | 780 | 482 |
| 51 | 733 | 231 |
| 48 | 214 | 456 |
| 34 | 635 | 210 |
| — | — | — |
| — | — | — |
| 3 | 316 | 189 |
| 8 | 224 | 369 |
| 11 | 400 | 267 |
| 9 | 264 | 450 |

Thereafter, in accordance with the coordinate data in Table 3, the indicators are additionally displayed on the retrieval chart shown in FIG. 4b.

At next step S37, Table 3 which is formed at the step S36 is added to Table 1b. The contents in Table 3 may be added to the end of the contents of Table 1b. In addition, if each line of Table 1b is sorted in accordance with a particular rule, it is also possible to accordingly insert each line data of Table 3 into Table 1b. In this embodiment, the contents of Table 3 are simply added to the end of Table 1b and thereby Table 4b is formed.

At step S38, the indicators shown in Table 2 are deleted from FIG. 4a.

Then, at step S39, the line data contained in Table 2 are deleted from Table 1a and thereby Table 4a is formed.

In the above mentioned embodiment, a moving operation of indicators has been described. If the steps S38 and S39 in the flow chart shown in FIG. 5 are not executed, a copying operation of the indicators can be executed.

Now, another embodiment according to the present invention will be described. In this embodiment, a part of indicators of the retrieval chart shown in FIG. 4a are grouped so as to form another retrieval chart.

Figure 10:
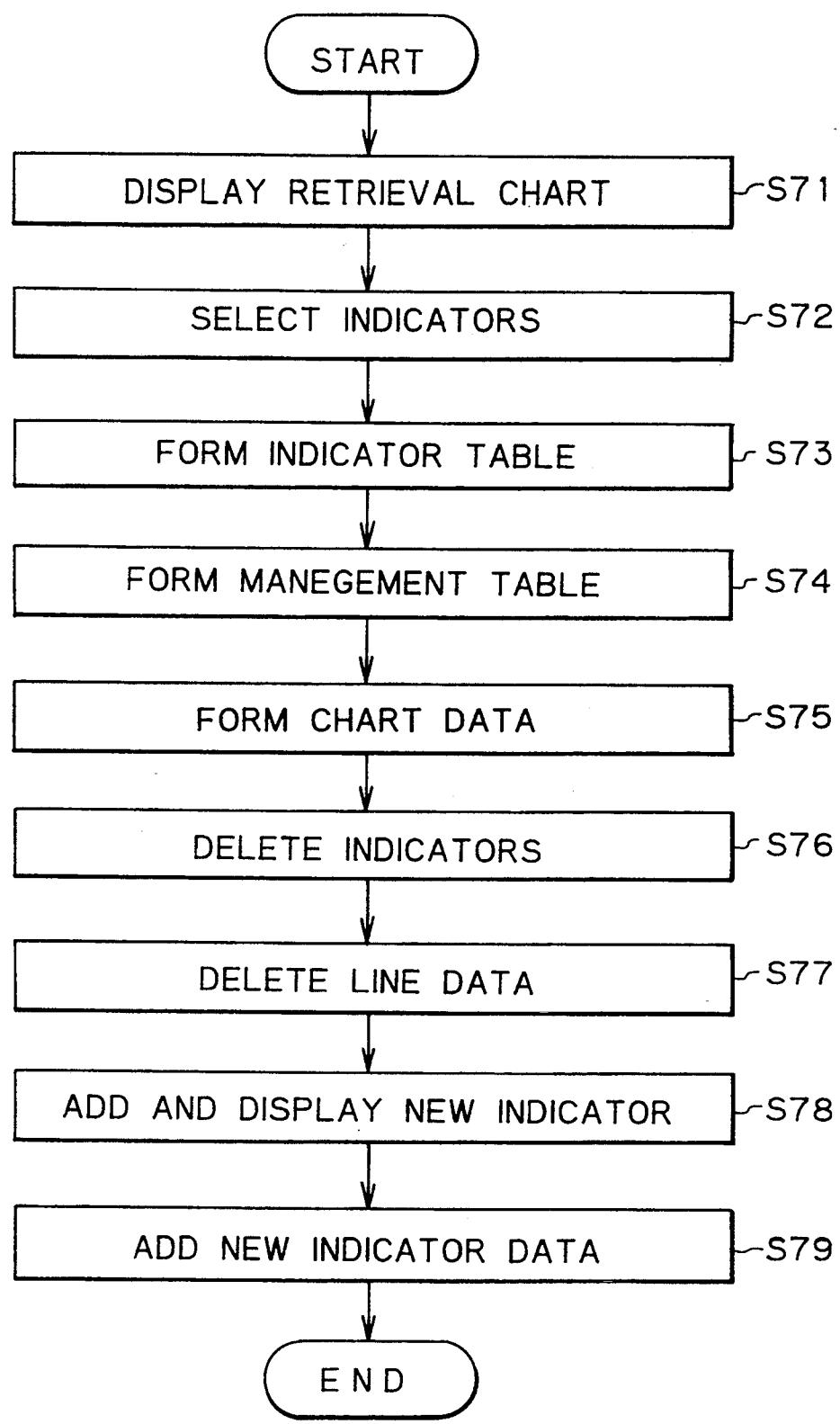
FIG. 10 shows a process flow of a program of another embodiment according to the present invention.

First, with reference to a flow chart shown in FIG. 10, the embodiment is described.

At step S71, the retrieval chart shown in FIG. 4a is displayed on the second image display unit 15.

At step S72, indicators are selected from the source retrieval chart shown in FIG. 4a so as to form another retrieval chart. In other words, the same process as that of the step S32 shown in FIG. 5 is executed.

Then, at step S73, by executing the same process as that of the step S33 in FIG. 5, the indicator table shown in Table 2 is formed.

At step S74, a management table consisting of only the indicators in Table 2 is formed. In other words, like the step S35 in FIG. 5, assume that the minimum values, the maximum values, magnifications, and display margins of the X and Y coordinates in Table 2 are (X0, Y0), (X1, Y1), (BX, BY), and (MX, MY), respectively. The following calculations with respect to the coordinate values in Table 2 are executed so as to form a new management table. The values of BX, BY, MX, and MY have been determined or designated by the operator by means of the keyboard 11 or the like.

$$X \text{ coordinate} = (X \text{ coordinate} - X0) \times BX + MX$$

$$Y \text{ coordinate} = (Y \text{ coordinate} - Y0) \times BY + MY$$

In the embodiment, since it is assumed that BX=3, BY=4, and MX=MY=50, a management table shown in Table 5 is created.

TABLE 5

| ID number | X coordinate | Y coordinate |
|---|---|---|
| 3 | 188 | 50 |
| 8 | 50 | 290 |
| 11 | 314 | 154 |
| 9 | 110 | 398 |

At step S75, chart data for a new retrieval chart is formed. In other words, only chart data which is present in the area of rectangular coordinates (X0−MX, Y0−MX) and (Y1+MX, Y1+MY) is selected from the chart shown in FIG. 4a. Then, the selected data is multiplied by BX in the horizontal direction and by BY in the vertical direction and thereafter the resultant data is stored as another chart file. Instead of such chart data, it is possible to use chart data which has been formed or use blank chart data.

At next step S76, by executing the same process as that of the step S38 in FIG. 5, the indicators shown in Table 2 are deleted from the retrieval chart shown in FIG. 4a.

At step S77, by executing the same process as that of the step S39 in FIG. 5, the same line data as that shown in Table 2 is deleted from Table 1a to form Table 4a.

At next step S78, an indicator representing the newly formed retrieval chart is displayed on FIG. 4a. In other words, the indicator is added to the chart at the following coordinates.

Coordinates $(X, Y) = \{(X1+X0)/2, (Y1+Y0)/2\}$

Figure 11:
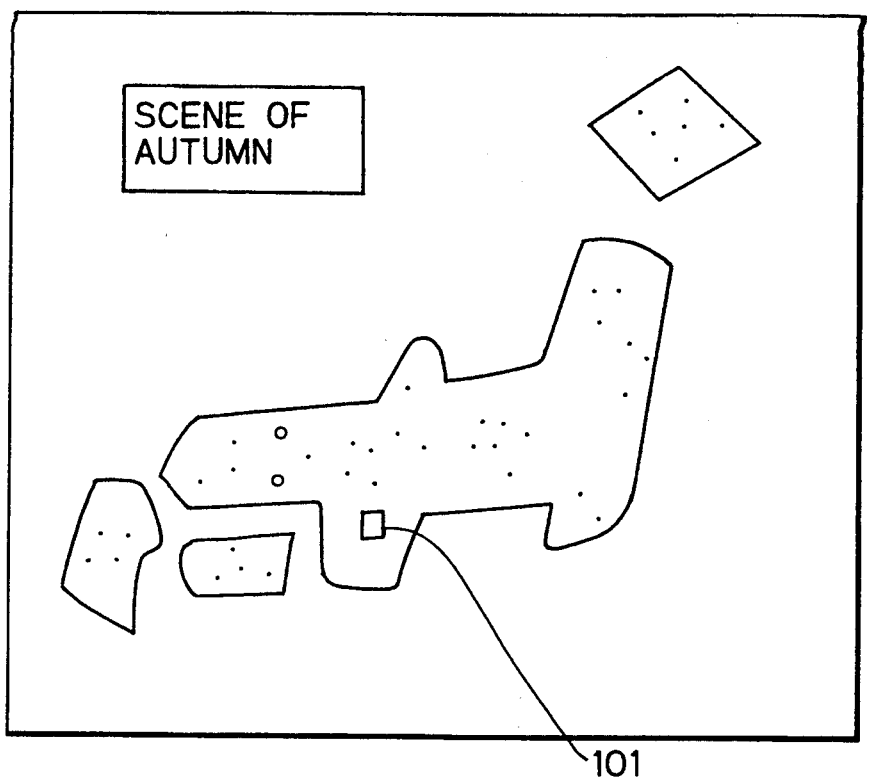
FIG. 11 shows an example of a retrieval chart of the embodiment shown in FIG. 10.

This indicator represents a retrieval chart, while other indicators represent image data. Thus, the former indicator and the latter indicators are distinguished by using different marks. FIG. 11 shows an example of the retrieval chart where the formed indicator 101 is added.

At step S79, the data of the indicator which has been added at the step S78 are also added to Table 4a. If the ID number of the indicator data is 100, the coordinates are (247, 390). Thus, the indicator is added to Table 4a and thereby Table 6 is formed.

TABLE 6

| ID number | X coordinate | Y coordinate |
|---|---|---|
| 1 | 127 | 73 |
| 2 | 368 | 211 |
| 4 | 315 | 96 |
| 13 | 350 | 270 |
| 6 | 247 | 172 |
| 17 | 165 | 116 |
| 100 | 247 | 390 |
| — | — | — |
| — | — | — |

Figure 12:
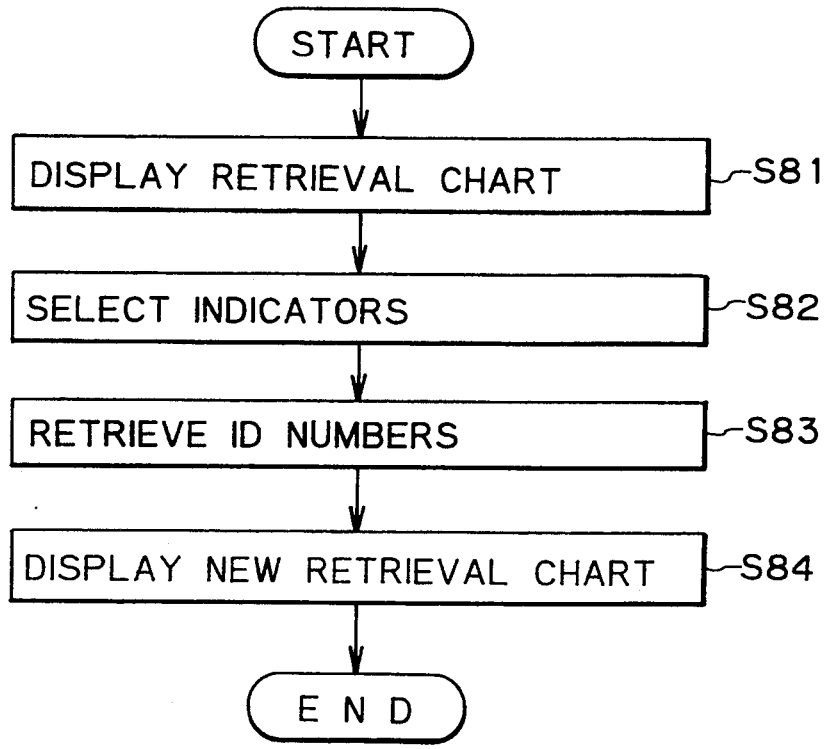
FIG. 12 shows a process flow of a program for displaying the new retrieval chart of the embodiment shown in FIG. 10.

FIG. 12 is a flow chart describing a process for displaying a new retrieval chart formed by the embodiment shown in FIG. 10.

At step S81 in FIG. 12, a new retrieval chart formed by the embodiment shown in FIG. 10 is displayed on the second image display unit 15. FIG. 11 shows an example of the new retrieval chart shown in the second image display unit 15. In FIG. 11, reference numeral 101 is an indicator representing a different retrieval chart.

At next step S82, the operator selects the indicator 101 shown in FIG. 11 by designating the indicator 101 with the cursor and by clicking a mouse button of the mouse 11.

Thus, at step S83, the processor unit 16 loads the contents of Table 6 which is a management table of FIG. 11 from the external memory unit 13 to the memory unit 17. By referring the loaded contents of Table 6, the processor unit retrieves the ID number 100 of the indicator 101 in accordance with coordinates of the mouse cursor at a time the mouse button is clicked.

Figure 13:
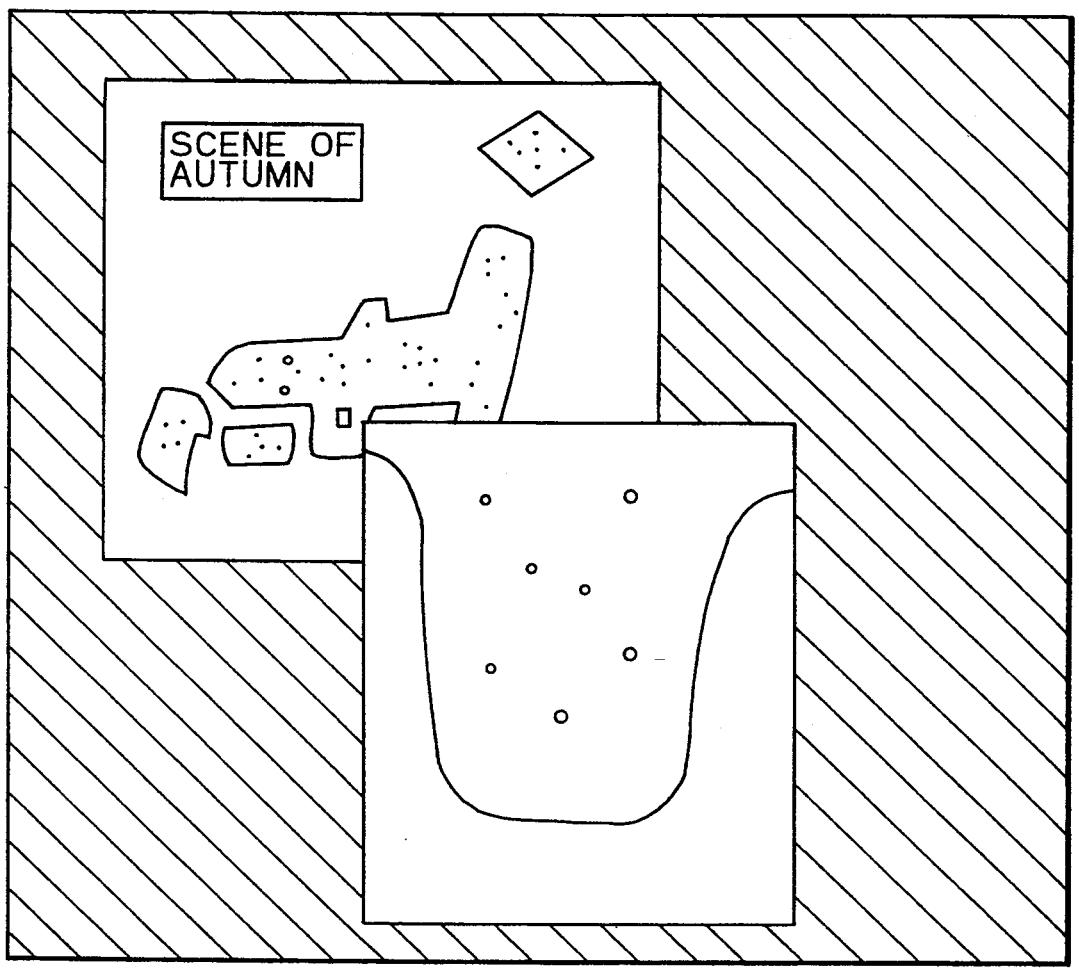
FIG. 13 shows an example of display of retrieval charts shown in FIG. 12.

At step S84, the processor unit 16 loads data of the ID number 100, that is the management table data and the chart data formed in the processes shown in FIG. 10, from the external memory unit 13, and displays a new retrieval chart on the second image display unit 15 in substantially the same process as that of the step S31. FIG. 13 shows an example of this new retrieval chart shown in the second image display unit 15.

Figure 14:
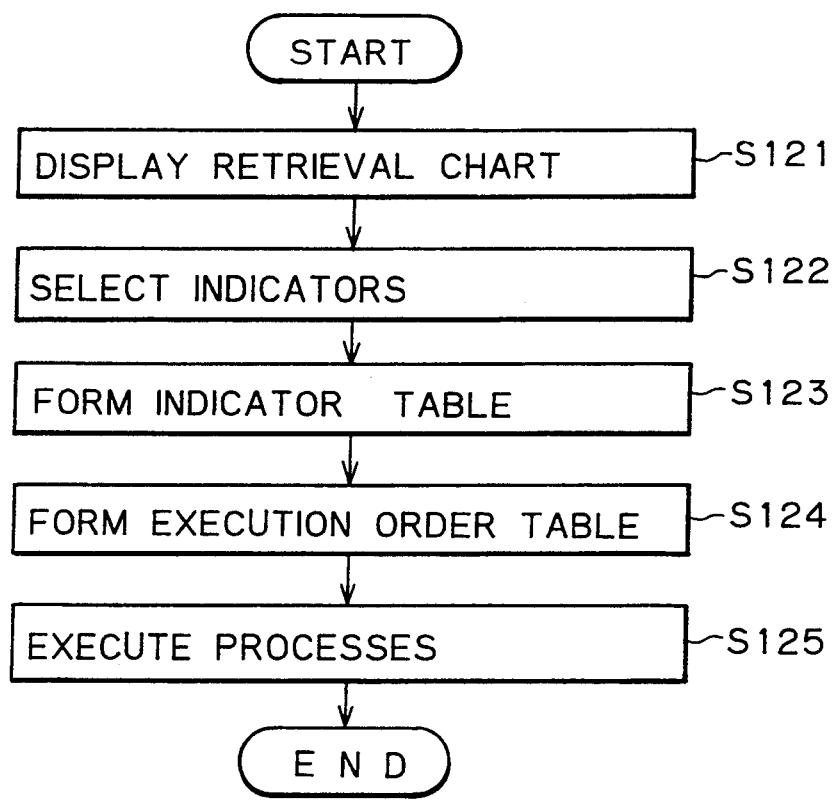
FIG. 14 shows a process flow of a program for executing functions symbolized by the indicators of the embodiment shown in FIG. 10.

Hereinafter, a process for successively executing functions symbolized by extracted indicators, respectively will be described with reference to a flow chart shown in FIG. 14.

According to this embodiment, image data corresponding to a part of the indicators in the source retrieval chart shown in FIG. 4a are successively displayed on the first image display unit 14. Each ID number of the management table corresponds to an ID number in a process program for displaying an image intrinsic to each ID number on the first display unit 14.

At step S121, the retrieval chart shown in FIG. 4a is displayed on the second image display unit 15.

At step S122, indicators corresponding to the image to be displayed are selected from the source retrieval chart shown in FIG. 4a. In other words, the same process as that of the step S32 in FIG. 5 or the step S72 in FIG. 10 is executed.

At step S123, the same process as that of the step S33 in FIG. 5 or the step S73 in FIG. 10 is executed so as to form an indicator table like the Table 2 (hereinafter this indicator table is also referred as Table 2).

Then, at step S124, an execution order of process with respect to each line data is determined based upon the indicator table of Table 2. In this embodiment, since the processes are executed in the order of rasters on the display screen, each line data in Table 2 is sorted in the order of rasters to form an execution order table shown in Table 7.

TABLE 7

| ID number | X coordinate | Y coordinate |
|---|---|---|
| 3 | 249 | 307 |
| 11 | 291 | 333 |
| 8 | 203 | 367 |
| 9 | 223 | 394 |

In the conversion from Table 2 to Table 7, each line is sorted in the ascending order of evaluation value A calculated by the following evaluation equation (1).

$$A = Y \text{ coordinate} \times YMAX + X \text{ coordinate} \qquad (1)$$

where YMAX is a value where "1" is added to the maximum value of Y coordinate of the retrieval chart available in this system. In this embodiment, this value YMAX is "1000".

In the embodiment, as described above, the processes are executed in the order of rasters. However, by using the following equation (2), (3), or the like as the evaluation equation in the step S124, the processes can be executed in various orders.

$$A = (X \text{ coordinate} - X0)^2 + (Y \text{ coordinate} - Y0)^2 \qquad (2)$$

where (X0, Y0) are the minimum values of the X coordinate and Y coordinate in Table 2. The equation (2) is an evaluation equation used when functions of the selected indicators are executed successively in the order from left to right and from top to bottom.

$$A = (X \text{ coordinate} - XM)^2 + (Y \text{ coordinate} - YM)^2 \qquad (3)$$

where (XM, YM) is a middle point of the maximum value (X1, Y1) and the minimum value (X0, Y0) of the X coordinate and Y coordinate in Table 2. The middle point (XM, YM) is calculated by the following equations.

$$XM = (X0 + X1)/2$$

$$YM = (Y0 + Y1)/2 \qquad (4)$$

The equation (3) is an evaluation equation where the indicators being selected are executed outwardly from the center of the area.

At step S125, the programs corresponding the ID numbers are executed in the order of the execution table formed at the step S124. Namely, the processes corresponding to ID numbers 3, 11, 8, 9, ... of Table 7 are executed in succession. As the results, images corresponding to the ID numbers are successively displayed on the first image display unit 14.

In the above-mentioned embodiment, the processes executed by the respective programs corresponding to the ID numbers are image display processes. However, by changing the programs, various processes can be executed. For example, in case of a program for deleting indicators corresponding to ID numbers, indicators being selected are deleted.

In the aforementioned embodiments, the operator creates and designates an optional closed area with a coordinate designation unit such as the mouse so as to select indicators.

Now, another embodiment according to the present invention will be described. According to this embodiment, by designating one point in an optional closed area in a chart pattern displayed as a retrieval chart, indicators can be selected.

According to the embodiment, indicators within the Shikoku region in the retrieval chart shown in FIG. 4a are together selected and images corresponding to the indicators are displayed on the first image display unit 14. Table 8 is a management table for storing the coordinates of the indicators shown in FIG. 4a and the ID numbers of image data designated by the indicators.

TABLE 8

| ID number | X coordinate | Y coordinate |
|---|---|---|
| 1 | 127 | 73 |
| 2 | 368 | 211 |
| 3 | 249 | 307 |
| 4 | 315 | 96 |
| 8 | 203 | 387 |
| 13 | 350 | 270 |
| 11 | 291 | 333 |
| 6 | 247 | 172 |
| 9 | 223 | 394 |
| 17 | 165 | 116 |
| — | — | — |
| — | — | — |

With reference to a flow chart shown in FIG. 15, the operation of this embodiment will now be described.

At step S141, the retrieval chart shown in FIG. 4a is displayed on the second image display unit 15. In other words, the corresponding management table data are loaded from the external memory unit 13 to the memory unit 17, and then while indicator data are written to each coordinate position in the indicator plane 23a, chart data are written onto the chart plane 24a.

Figure 16:
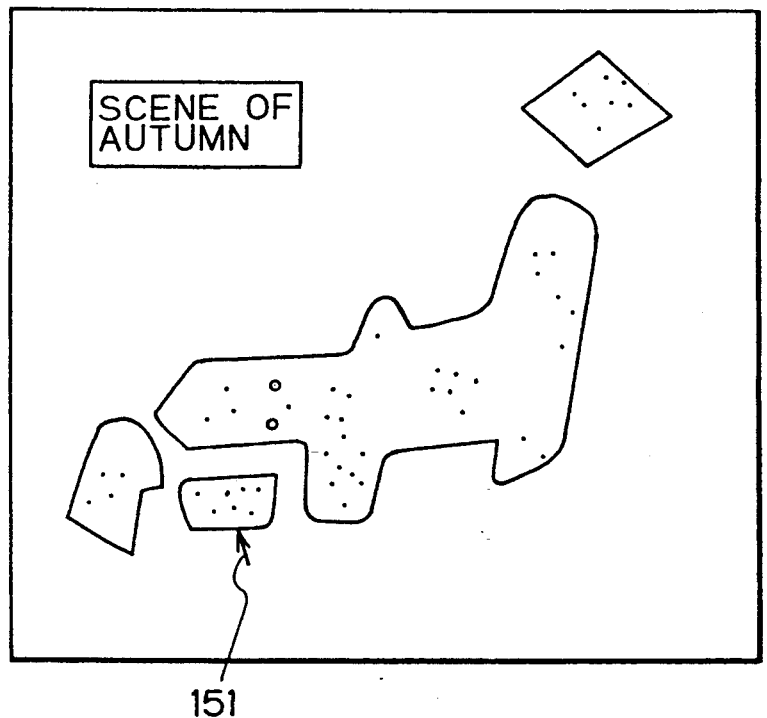
FIG. 16 shows an example of a retrieval chart of the embodiment shown in FIG. 15.

At next step S142, by designating one point in an optional closed area of the chart, indicators corresponding to images to be displayed are together selected. For example, as shown in FIG. 16, if one point in the Shikoku region is designated with a mouse cursor using the mouse 11, indicators existed in this Shikoku region are together selected. An arrow mark 151 shown in FIG. 16 is the mouse cursor.

At step S143, the indicator extracting unit retrieves line data (a set of ID number and X and Y coordinates) having the X and Y coordinates within the closed area selected at the step S142 from the management table shown in Table 1a stored in the memory unit 17 and forms an indicator table consisting of only related line data. In other words, the indicator extracting unit scans all the coordinates in the closed area including the coordinates designated at the step S142 and copies the line data with the same coordinate data as each scanning point to an indicator table to be newly formed. Table 9 shows an example of a newly formed indicator table. In the embodiment, Table 9 contains line data for seven indicators in the Shikoku region.

TABLE 9

| ID number | X coordinate | Y coordinate |
|---|---|---|
| 3 | 249 | 307 |
| 8 | 203 | 367 |
| 11 | 291 | 333 |
| 9 | 223 | 394 |
| 22 | 196 | 350 |
| 36 | 182 | 321 |
| 53 | 231 | 387 |

At next step S144, image data corresponding to the ID numbers in Table 9, formed at the step S143 are successively displayed on the first image display unit 14. In fact, images are displayed in the sequence of the ID numbers 3, 8, 11, 9, 21, 36, and 53. Although, images are displayed in the order of storage in Table 9 in this embodiment, it is possible to sort the images to be displayed in different orders, for example, in the orders of ID numbers or in the order of X and Y coordinates.

Next, a method of moving a part of indicators and charts shown in FIG. 4a to a retrieval chart shown in FIG. 17 by designating one point in the closed area in the source retrieval chart will be described.

Figure 18:
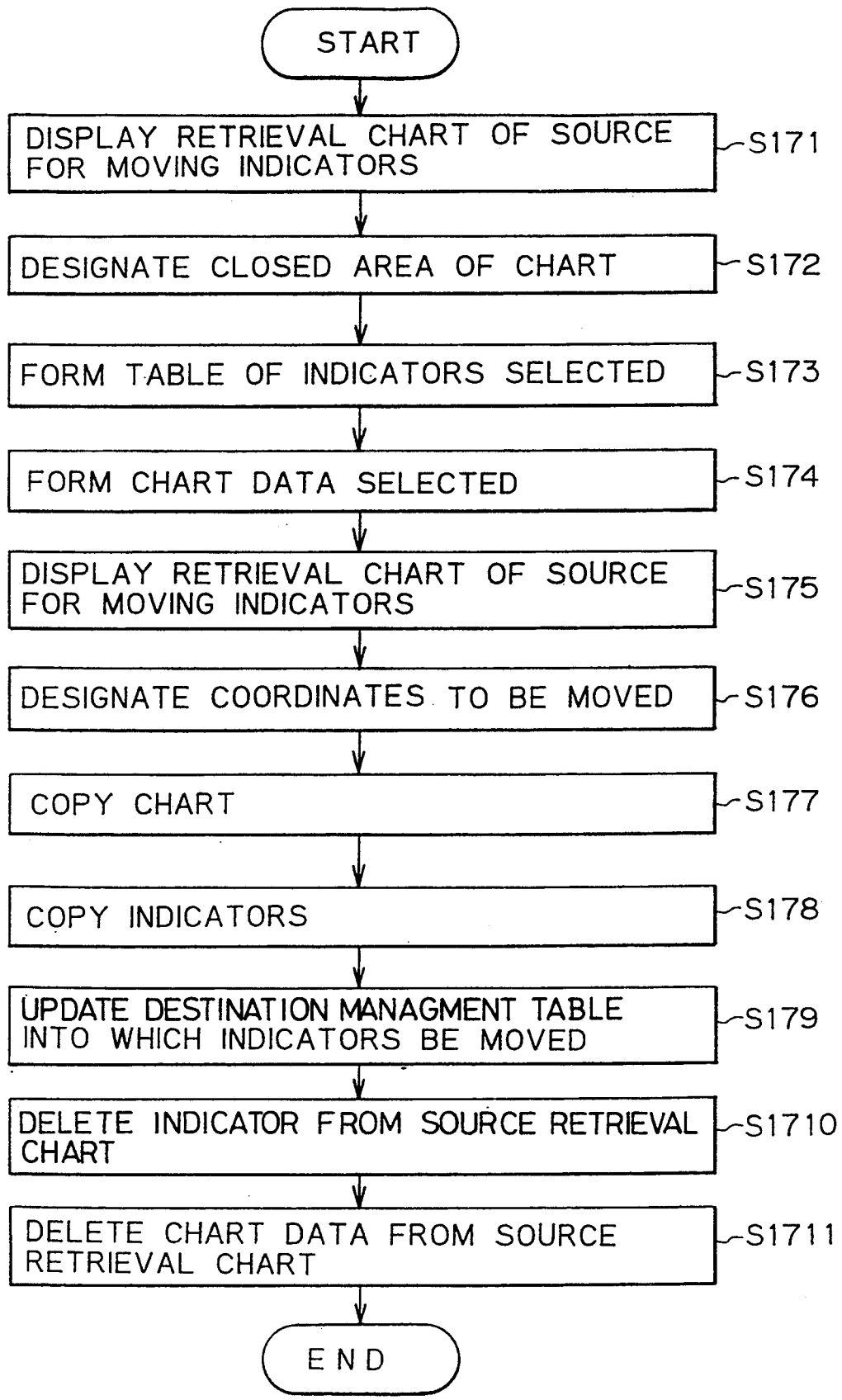
FIG. 18 shows a process flow of a part of program of the embodiment shown in FIG. 15.

With reference to a flow chart shown in FIG. 18, this method will be described.

Figure 15:
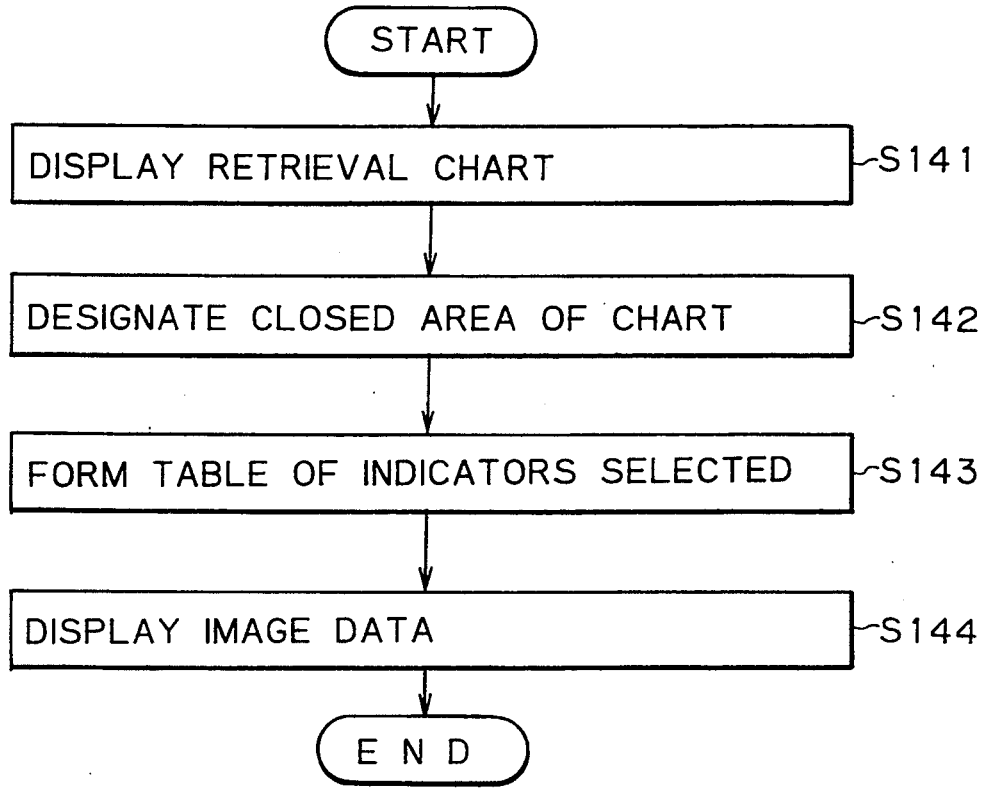
FIG. 15 shows a process flow of a part of program of further embodiment according to the present invention.

At step S171, with the same process as that of the step S141 in FIG. 15, the source retrieval chart shown in FIG. 4a is displayed on the second image display unit 15.

Figure 17:
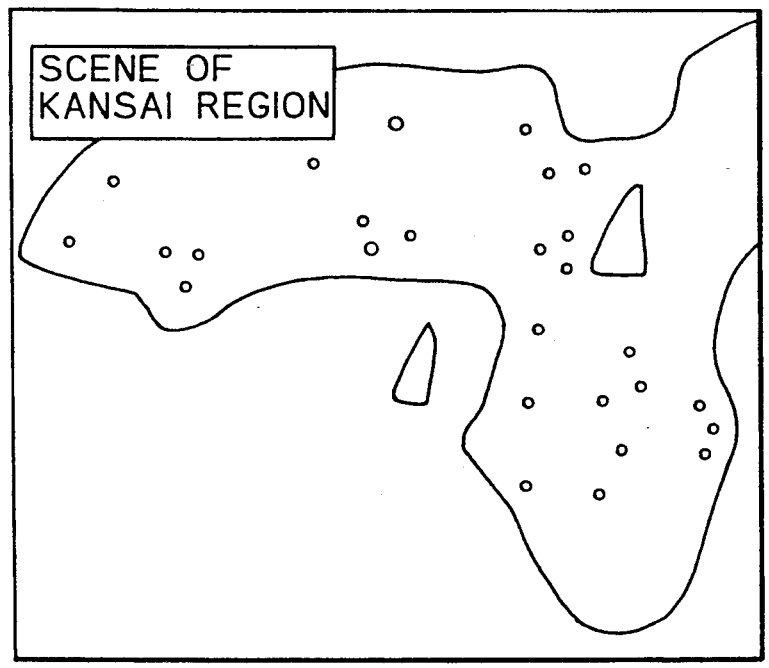
FIG. 17 shows a retrieval chart obtained by the embodiment shown in FIG. 15.

At next step S172, indicators and charts to be moved from the source retrieval chart of FIG. 4a to the destination retrieval chart shown in FIG. 17 are selected. In other words, the same process as that of the step S142 in FIG. 15 is executed.

At step S173, with the same process as that of the step S143 in FIG. 15, the indicator table shown in Table 9 is formed.

Figure 19:
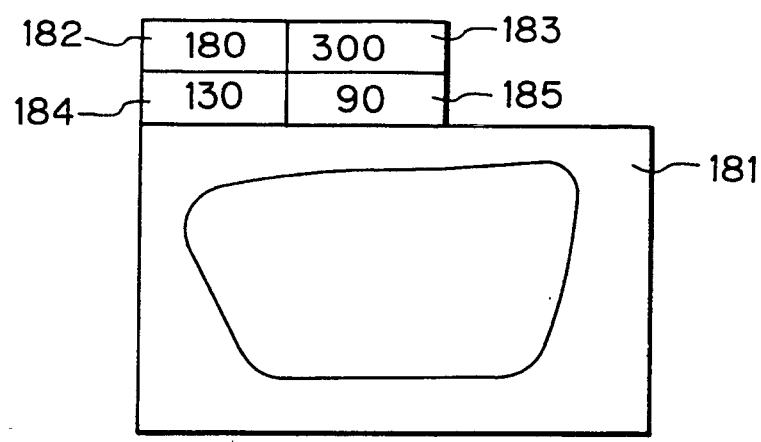
FIG. 19 shows an example of chart data of the embodiment shown in FIG. 15.

At step S174, chart data in the closed area designated at the step S172, which consists of only the chart of Shikoku, are formed and then stored in the memory unit 17. As shown in FIG. 19, the chart data consist of chart data representing the Shikoku region, X and Y coordinate values at the upper left corner of the chart, which are indicated by coordinates of FIG. 4a, and the number of pixels in the X and Y directions of the chart data. In FIG. 19, reference numeral 181 is chart data representing the Shikoku region. Reference numeral 182 is the X coordinate at the upper left corner of the chart. Reference numeral 183 is the Y coordinate at the upper left corner of the chart. Reference numeral 184 is the number of pixels in the X direction of the chart data represented by the reference numeral 181. Reference numeral 185 is the number of pixels in the Y direction of the chart data represented by the reference numeral 181. Hereinafter, numeric values represented with the reference numerals 182, 183, 184, and 185 are referred to as X0, Y0, DX, and DY, respectively.

Figure 20:
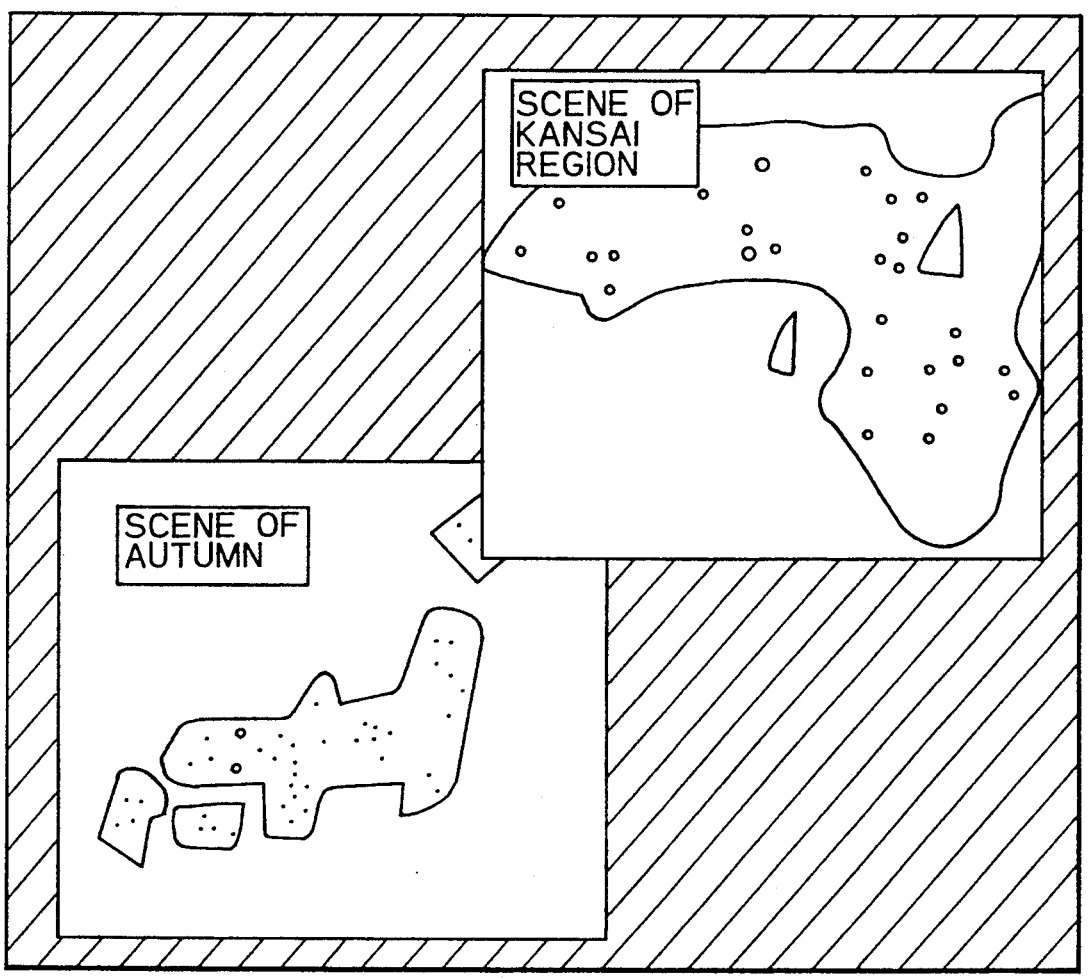
FIG. 20 shows an example of display of retrieval charts of the embodiment shown in FIG. 15.

At next step S175, the retrieval chart shown in FIG. 17 is displayed on the second image display unit 15. At that time, it is possible to display the retrieval chart on the entire screen of the display area of the display unit 15 or to display the retrieval chart shown in FIG. 4a and that shown in FIG. 17 in different windows on the display unit 15 at the same time as shown in FIG. 20.

At step S176, the operator designates a destination position in the retrieval chart shown in FIG. 17, to which position the chart data formed at the step S174 should be moved. In other words, the following processes [A] and [B] are executed.

[A] A rectangle whose horizontal size is DX and vertical size is DY and which is moved with the mouse 11 is written in the cursor plane 25 so as to superimpose the rectangle on the retrieval chart shown in FIG. 17.

Figure 21A:
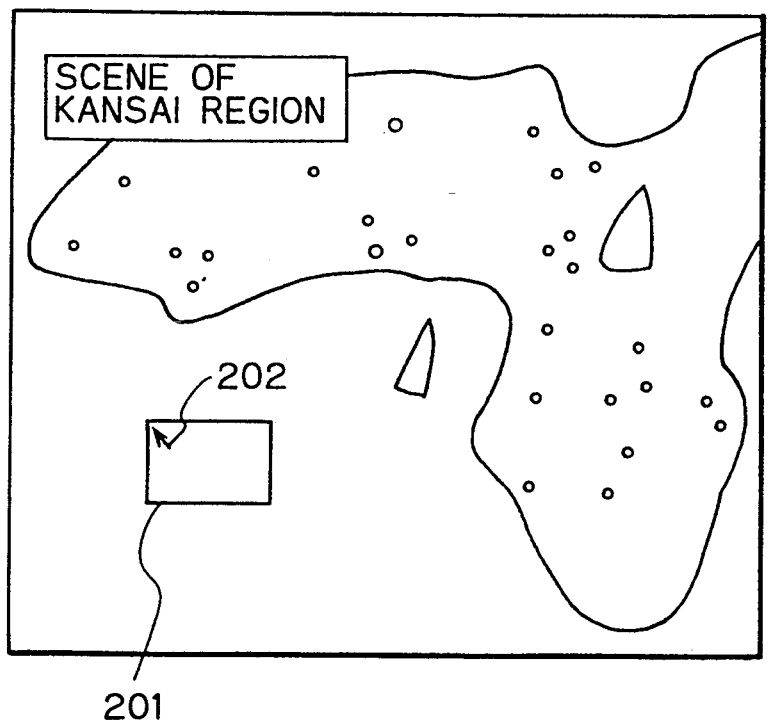
FIGS. 21a and 21b show charts describing a method of designating the designation of the embodiment shown in FIG. 15.
Figure 21B:
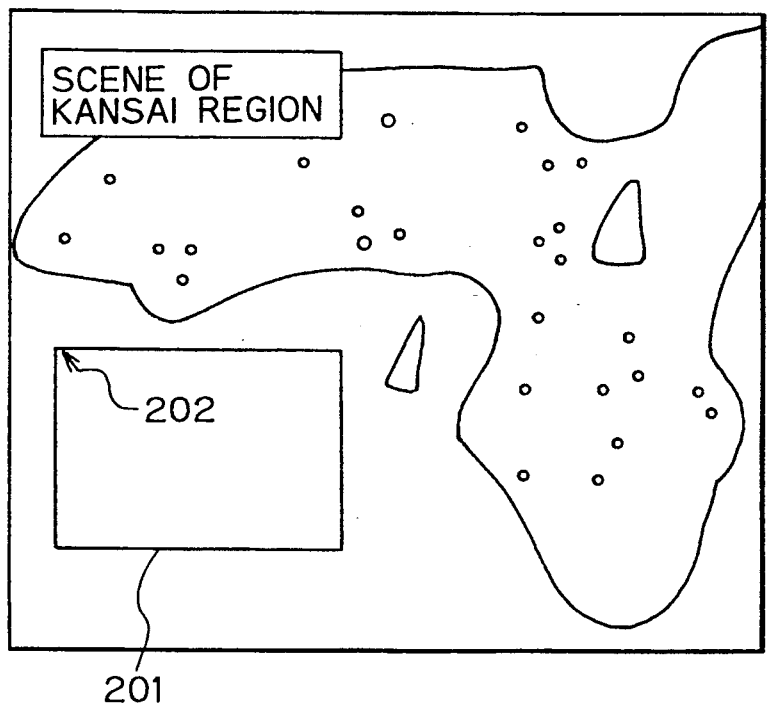

[B] By changing the display position of the rectangle written at the process of [A] by means of the mouse 11, the operator instructs the destination position in the retrieval chart shown in FIG. 17 to which position the chart data shown in FIG. 19 should be moved (see FIGS. 21a and 21b).

At that time, by designating movement magnifications BX and BY from the keyboard 10, the size of the rectangle to be displayed may be changed. FIG. 21a shows the case where the movement magnifications are not changed (BX=BY=1). FIG. 21b shows the case where BX=BY=2.5. In each of FIGS. 21a and 21b, reference numeral 201 is a rectangle displayed in [A]. Reference numeral 202 is a mouse cursor.

In this embodiment, the upper left corner of the rectangle is an indication point of the mouse 11, and it is assumed that the coordinates at the indication point of the mouse 11 is set to (X2, Y2)=(50, 250).

Figure 22:
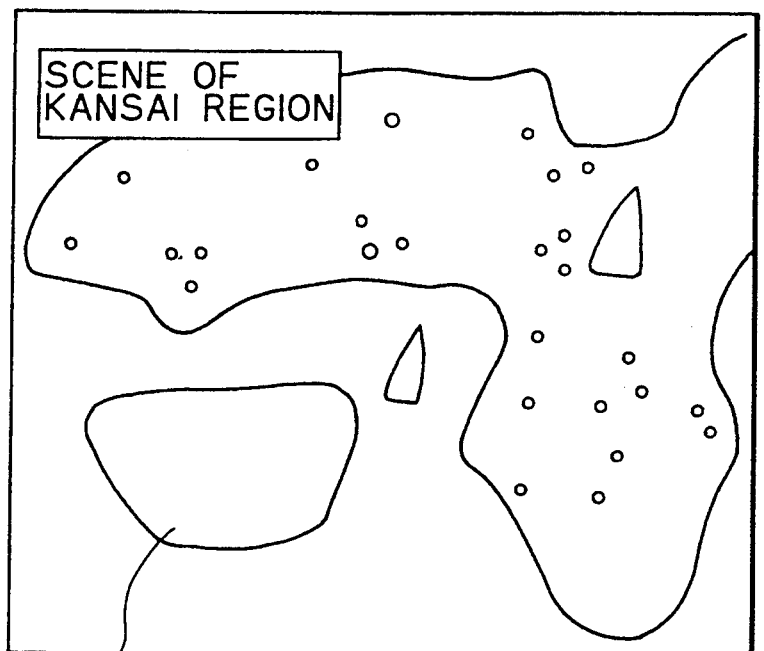
FIG. 22 shows a progress of a process of the embodiment shown in FIG. 15.

At step S177, in accordance with the position and the magnifications designated in [B] at the step S176, the chart shown in FIG. 19 is copied to the retrieval chart shown in FIG. 16. In other words, the chart shown in FIG. 19 is magnified by BX and BY in the horizontal direction and in the vertical direction, respectively. The resultant chart is written onto the chart plane 24 with the coordinates where (X2, Y2) are placed at the upper left corner. As the result, a retrieval chart as shown in FIG. 22 is displayed on the second image display unit 19. In FIG. 22, reference numeral 211 is the chart added at the step S177.

At step S178, indicators represented by line data in the selection table formed at the step S173 are copied to the retrieval chart shown in FIG. 22. In other words, the following processes [A] and [B] are executed.

[A] X and Y coordinates in Table 9 are calculated by the following equations so as to form another indication table, namely Table 10.

$$\begin{aligned}X \text{ coordinate} &= (X \text{ coordinate} - X0) \times BX + X2 \\ &= (X \text{ coordinate} - 180) \times 2.5 + 50 \\ Y \text{ coordinate} &= (Y \text{ coordinate} - Y0) \times BY + Y2 \\ &= (Y \text{ coordinate} - 300) \times 2.5 + 250\end{aligned}$$

TABLE 10

| ID number | X coordinate | Y coordinate |
| --- | --- | --- |
| 3 | 222.5 | 267.5 |
| 8 | 107.5 | 417.5 |
| 11 | 327.5 | 332.5 |
| 9 | 157.5 | 485 |
| 22 | 90 | 375 |
| 36 | 55 | 302.5 |
| 53 | 177.5 | 467.5 |

Figure 23:
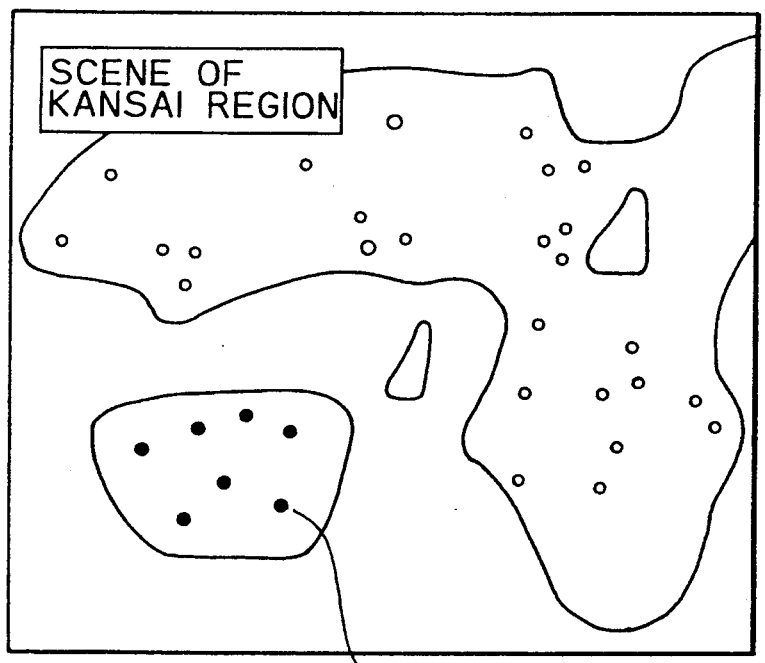
FIG. 23 shows another progress of the process of the embodiment shown in FIG. 15.

[B] Indicators designating ID numbers are displayed at positions of the coordinate vales of Table 10, positions are shown in FIG. 22. As the results, a retrieval chart shown in FIG. 23 is displayed on the second image display unit 15. In FIG. 23, reference numeral 221 is an indicator additionally displayed at this step S178.

At next step S179, Table 10 formed at the step S178 is added to Table 11 so as to generate a management table of the retrieval chart shown in FIG. 23. This Table 10 may be added to the end of Table 11. In addition, when each line data of Table 11 has been sorted in accordance with a particular rule, each line data of Table 10 is inserted accordingly into Table 11. In this embodiment, Table 10 is simply added to Table 11 and thereby a new management Table 12 is formed.

At step S1710, the indicators shown in Table 9 are deleted from the retrieval chart shown in FIG. 4a. In addition, the line data contained in Table 9 is deleted from Table 8 and then the management table is updated. Thus, a new Table 13 is formed.

TABLE 11

| ID number | X coordinate | Y coordinate |
| --- | --- | --- |
| 21 | 129 | 417 |
| 23 | 875 | 83 |
| 25 | 424 | 382 |
| 26 | 709 | 117 |
| 30 | 383 | 960 |
| 27 | 259 | 510 |
| 29 | 780 | 482 |
| 51 | 733 | 231 |
| 48 | 214 | 456 |

TABLE 11-continued

| ID number | X coordinate | Y coordinate |
| --- | --- | --- |
| 34 | 635 | 210 |

TABLE 12

| ID number | X coordinate | Y coordinate |
| --- | --- | --- |
| 21 | 129 | 417 |
| 23 | 875 | 83 |
| 25 | 424 | 382 |
| 26 | 709 | 117 |
| 30 | 383 | 960 |
| 27 | 259 | 510 |
| 29 | 780 | 482 |
| 51 | 733 | 231 |
| 48 | 214 | 456 |
| 34 | 635 | 210 |
| — | — | — |
| — | — | — |
| 3 | 222.5 | 267.5 |
| 8 | 107.5 | 417.5 |
| 11 | 327.5 | 332.5 |
| 9 | 157.5 | 485 |
| 22 | 90 | 375 |
| 36 | 55 | 302.5 |
| 53 | 177.5 | 467.5 |

TABLE 13

| ID number | X coordinate | Y coordinate |
| --- | --- | --- |
| 1 | 127 | 73 |
| 2 | 368 | 211 |
| 4 | 249 | 307 |
| 13 | 315 | 96 |
| 6 | 203 | 367 |
| 17 | 350 | 270 |

Figure 24:
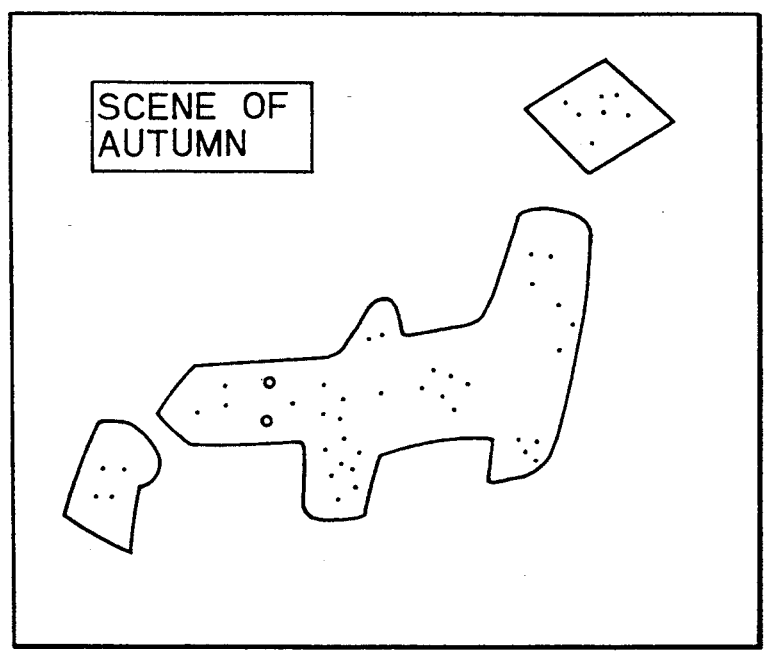
FIG. 24 shows a display example of the retrieval chart of the embodiment shown in FIG. 15.

At step S1711, the chart data shown in FIG. 19 is deleted from the retrieval chart shown in FIG. 4a. As the results of the steps S1710 and S1711, the retrieval chart shown in FIG. 24 is displayed on the second image display unit 15. Table 13 shows a management table of this retrieval chart.

In the above embodiment, a moving operation of indicators has been described. However, when the steps S1710 and S1711 of the flow chart shown in FIG. 18 are not executed, a copying operation of the indicators is executed.

Many widely different embodiments of the present invention may be constructed without departing from the spirit and scope of the present invention. It should be understood that the present invention is not limited to the specific embodiments described in the specification, except as defined in the appended claims.

What is claimed is:

1. A data base system comprising:
   means for generating a chart pattern in accordance with chart data applied thereto;
   means for managing a plurality of indicators which symbolize particular functions, and attribute information associated with the indicators;
   means for generating indicator patterns representative of the indicators in accordance with the attribute information associated with the respective indicators, said attribute information being managed by said indicator management means;
   means having a screen, for displaying the chart pattern generated by said chart generation means and the indicator patterns generated by said indicator pattern generation means, on the screen as a retrieval chart;
   means for designating a desired area on the retrieval chart displayed on the screen of said display means;
   means for extracting a plurality of indicators included in the area designated by said designation means, by retrieving the attribute information associated with the indicators included in the designated area managed by said indicator management means; and
   means for processing together the indicators extracted by said extraction means.

2. A data base system as claimed in claim 1, wherein said indicator management means includes means for storing a table with respect to the indicators and the attribute information associated with said indicators respectively.

3. A data base system as claimed in claim 2, wherein said processing means includes means for forming a new table with respect to the indicators extracted by said extraction means and the attribute information associated with said extracted indicators respectively.

4. A data base system as claimed in claim 3, wherein said indicator management means further includes means for storing the new table with respect to the indicators extracted by said extraciton means and the attribute information associated with said extracted indicators respectively.

5. A data base system as claimed in claim 1, wherein said processing means includes means for copying all the indicators extracted by said extraction means, from a source chart to a destination chart.

6. A data base system as claimed in claim 5, wherein said copying means includes means for adding all the indicators extracted by said extraction means to said destination chart.

7. A data base system as claimed in claim 5, wherein said indicator management means includes a first memory means for storing a first table with respect to the indicators in said source chart and the attribute information associated with said indicators respectively, a second memory means for storing a second table with respect to the indicators in said destination chart and the attribute information associated with said indicators respectively, and a third memory means for storing a third table with respect to the indicators extracted by said extraction means and the attribute information associated with said indicators respectively.

8. A data base system as claimed in claim 7, wherein said copying means includes means for adding said third table to said second table.

9. A data base system as claimed in claim 1, wherein said processing means includes means for moving all the indicators extracted by said extraction means, from a source chart to a destination chart.

10. A data base system as claimed in claim 9, wherein said moving means includes means for adding all the indicators extracted by said extraction means to said destination chart and means for deleting all the indicators extracted by said extraction means from said source chart.

11. A data base system as claimed in claim 9, wherein said indicator management means includes a first memory means for storing a first table with respect to the indicators in said source chart and the attribute information associated with said indicators respectively, a second memory means for storing a second table with respect to the indicators in said destination chart and the attribute information associated with said indicators respectively, and a third memory means for storing a third table with respect to the indicators extracted by said extraction means and the attribute information associated with said indicators respectively.

12. A data base system as claimed in claim 11, wherein said moving means includes means for adding said third table to said second table and means for deleting said third table from said first table.

13. A data base system as claimed in claim 1, wherein said processing means includes means for successively executing functions symbolized by said indicators which are extracted by said extraction means, in an order defined by the attribute information associated with said respective indicators.

14. A data base system as claimed in claim 13, wherein said processing means includes means for forming an execution table with respect to the indicators extracted by said extraction means and the attribute information associated with said indicators respectively, said indicators and attribute information being rearranged to an appropriate order for execution.

15. A data base system as claimed in claim 1, wherein said designation means includes means for designating X and Y coordinates which are capable of defining the desired area.

16. A data base system as claimed in claim 15, wherein said desired area is rectangular and wherein said designation means includes means for designating X and Y coordinates defining the rectangular desired area.

17. A data base system as claimed in claim 1, wherein said designation means includes means for designating one point in an optional closed area on the retrieval chart.

* * * * *